US012804257B2

(12) United States Patent
Kudo et al.

(10) Patent No.: US 12,804,257 B2
(45) Date of Patent: Nov. 17, 2026

(54) IMAGING APPARATUS

(71) Applicant: Panasonic Intellectual Property Management Co., Ltd., Osaka (JP)

(72) Inventors: Yoshiaki Kudo, Osaka (JP); Jun Saiki, Hyogo (JP); Rintaro Wada, Osaka (JP); Tomonori Kono, Osaka (JP); Tetsuya Takeda, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 118 days.

(21) Appl. No.: 18/885,670

(22) Filed: Sep. 15, 2024

(65) Prior Publication Data

US 2025/0106505 A1 Mar. 27, 2025

(30) Foreign Application Priority Data

Sep. 26, 2023 (JP) ................................ 2023-163938

(51) Int. Cl.
*H04N 23/667* (2023.01)
*G03B 13/36* (2021.01)
(Continued)

(52) U.S. Cl.
CPC ........... *H04N 23/667* (2023.01); *G03B 13/36* (2013.01); *H04N 23/52* (2023.01); *H04N 23/651* (2023.01);
(Continued)

(58) Field of Classification Search
CPC ........ H04N 23/50; H04N 23/51; H04N 1/028; H04N 1/148; H04N 23/52; H04N 23/65;
(Continued)

(56) References Cited

U.S. PATENT DOCUMENTS 6,268,885 B1 * 7/2001 Ohta ...................... G02B 7/102
396/97
7,825,978 B2 * 11/2010 Ito ........................ H04N 23/667
348/222.1
(Continued)

FOREIGN PATENT DOCUMENTS

JP 2003-050344 A 2/2003
JP 2008-065193 A 3/2008
(Continued)

*Primary Examiner* — Sinh Tran
*Assistant Examiner* — Mehedi Hassan
(74) *Attorney, Agent, or Firm* — Renner, Otto, Boisselle & Sklar, LLP

(57) ABSTRACT

An imaging apparatus that performs image capturing operation in a plurality of operation modes, includes: an image sensor that captures a subject image via an optical system to generate image data; a temperature acquisition circuit that acquires temperature of the image sensor; and a controller that switches the plurality of operation modes based on the temperature of the image sensor. The plurality of operation modes includes a first operation mode and a second operation mode in which the image sensor consumes less power than in the first operation mode. The controller changes an operation mode of the imaging apparatus from the first operation mode to the second operation mode when the temperature of the image sensor increases to first temperature in image capturing operation in the first operation mode. The first temperature is lower than temperature at which execution of a predetermined function is restricted in the imaging apparatus.

8 Claims, 7 Drawing Sheets

100

(51) Int. Cl.
*H04N 23/52* (2023.01)
*H04N 23/65* (2023.01)
*H04N 23/67* (2023.01)

(52) U.S. Cl.
CPC ......... *H04N 23/672* (2023.01); *H04N 23/673* (2023.01)

(58) Field of Classification Search
CPC .. H04N 1/00204; H04N 23/60; H04N 23/651; H04N 23/667; H04N 23/531; G03B 17/02; G03B 2217/002
See application file for complete search history.

(56) References Cited

U.S. PATENT DOCUMENTS

2009/0009617 A1* 1/2009 Ito ........................ H04N 25/633 348/222.1
2009/0140125 A1* 6/2009 Takayama .............. H04N 23/54 250/214 R
2011/0205071 A1* 8/2011 Namekawa ............ H04N 23/65 361/103
2012/0026379 A1* 2/2012 Mori ...................... H04N 23/62 348/333.02
2015/0201121 A1 7/2015 Nobayashi
2017/0150126 A1* 5/2017 Kim ....................... G03B 13/36
2018/0217352 A1* 8/2018 Kamba ................ H04N 23/673
2020/0288047 A1* 9/2020 Sugiyama .............. H04N 23/45
2020/0412968 A1 12/2020 Shibuno
2022/0279112 A1* 9/2022 Naito ..................... G01K 13/00
2024/0048865 A1* 2/2024 Itoi ........................ H04N 23/65
2024/0305898 A1* 9/2024 Ishida .................... H04N 23/76
2024/0323515 A1* 9/2024 Kitai ........................ H04N 5/77

FOREIGN PATENT DOCUMENTS

JP 2014-063142 A 4/2014
JP 2021-005063 A 1/2021

* cited by examiner

*Fig. 2*

| (FOR CONTINUOUS AF OPERATION IN STILL IMAGE SHOOTING: P2<P1<P4<P3) | | AF METHOD | |
|---|---|---|---|
| | | PDAF | CONTRAST AF |
| POWER | IMAGE SENSOR | P1 | P2 |
| | CAMERA BODY | P3 | P4 |

| (FOR LIVE VIEW: p5>p6>p7) | PIXEL READOUT METHOD | | |
|---|---|---|---|
| | FULL PIXEL READOUT | PIXEL MIXTURE | PIXEL THINNING OUT |
| POWER | p5 | p6 | p7 |

IMAGING APPARATUS

TECHNICAL FIELD

The present disclosure relates to an imaging apparatus that performs image capturing operation in a plurality of operation modes.

BACKGROUND ART

JP 2008-065193 A discloses an imaging apparatus that performs hybrid AF for switching between an imaging signal AF and an external distance measurement AF in accordance with a focusing degree detected from an imaging signal. The imaging signal AF uses information corresponding to a contrast state of captured video, while the external distance measurement AF measures a distance to a subject by an external distance measurement system different from the imaging system. The imaging apparatus of JP 2008-065193 A sets the focusing degree as a condition for switching from the external distance measurement AF to the imaging signal AF based on measured temperature or the like of the external distance measurement system. In JP 2008-065193 A, the focusing degree of the switching condition is set to be higher as the temperature is higher, and switching to the imaging signal AF is performed after a focus lens is brought close to a focusing position by the external distance measurement AF as much as possible. In this manner, JP 2008-065193 A aims to improve performance (particularly, high-speed performance) of the hybrid AF.

SUMMARY

The present disclosure provides an imaging apparatus capable of suppressing increase in temperature in operation.

An imaging apparatus that performs image capturing operation in a plurality of operation modes, the imaging apparatus includes: an image sensor that captures a subject image via an optical system to generate image data; a temperature acquisition circuit that acquires temperature of the image sensor; and a controller that switches the plurality of operation modes based on the temperature of the image sensor. The plurality of operation modes includes a first operation mode and a second operation mode in which the image sensor consumes less power than in the first operation mode. The controller changes an operation mode of the imaging apparatus from the first operation mode to the second operation mode when the temperature of the image sensor increases to first temperature in image capturing operation in the first operation mode. The first temperature is lower than temperature at which execution of a predetermined function is restricted in the imaging apparatus.

According to the imaging apparatus of the present disclosure, it is possible to suppress increase in temperature in operation.

BRIEF DESCRIPTION OF DRAWINGS

FIG. 2 is a diagram for explaining an AF method in the digital camera;

DETAILED DESCRIPTION

Hereinafter, an embodiment will be described in detail with reference to the drawings as appropriate. However, description that is detailed more than necessary may be omitted. For example, detailed description of an already well-known matter and redundant description of substantially the same configuration may be omitted. This is to avoid unnecessary redundancy in the description below and to facilitate understanding of those skilled in the art. Note that the inventor(s) provide the accompanying drawings and the description below so that those skilled in the art can fully understand the present disclosure, and do not intend to limit the subject matter described in claims by these drawings and description.

First Embodiment

In a first embodiment, a digital camera that performs autofocus (AF) operation in two types of methods will be described as an example of the imaging apparatus according to the present disclosure.

1. Configuration

A configuration of a digital camera according to the first embodiment will be described with reference to FIGS. 1 to 3A and 3B.

Figure 1:
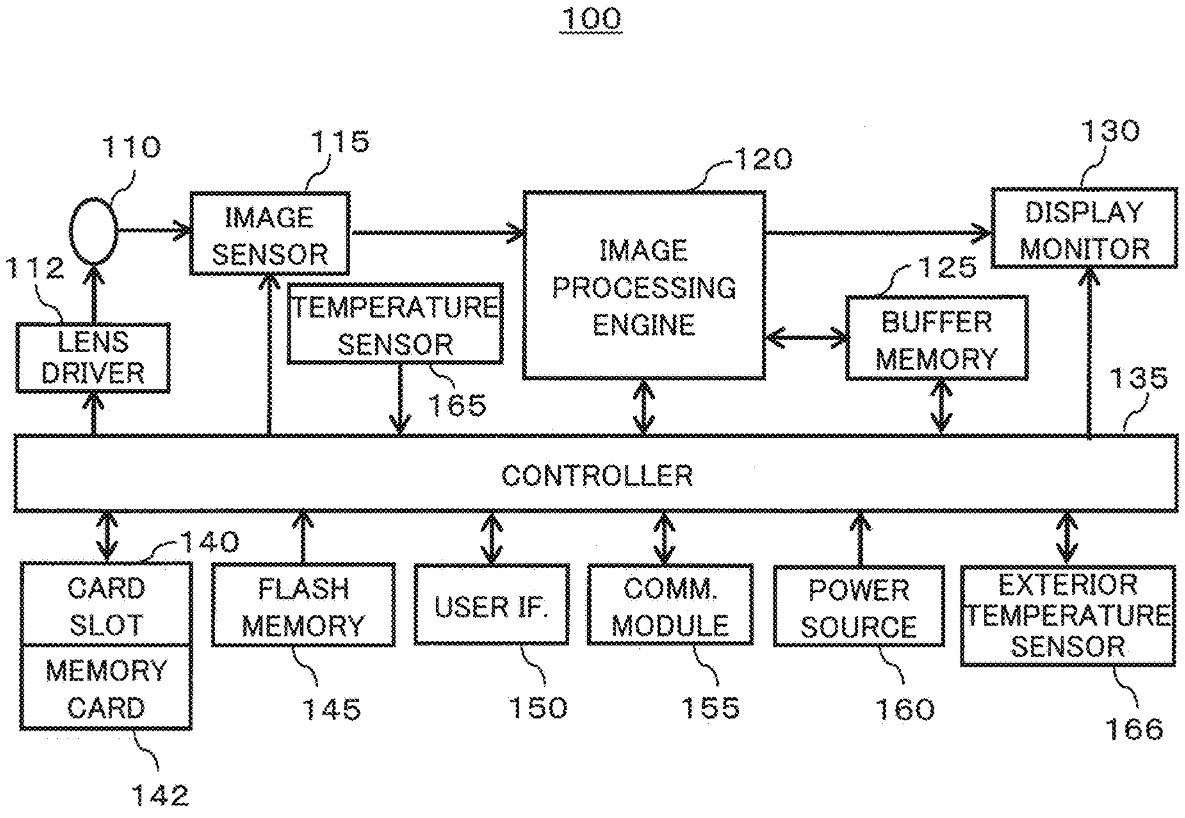
FIG. 1 is a diagram illustrating a configuration of a digital camera according to a first embodiment of the present disclosure.

FIG. 1 is a diagram illustrating a configuration of a digital camera 100 according to the present embodiment. The digital camera 100 according to the present embodiment includes an image sensor 115, an image processing engine 120, and a controller 135. The digital camera 100 further includes, for example, an optical system 110, a lens driver 112, a power source 160, a temperature sensor 165, and an exterior temperature sensor 166. Furthermore, the digital camera 100 includes a buffer memory 125, a display monitor 130, a card slot 140, a flash memory 145, a user interface 150, and a communication module 155.

The optical system 110 includes a focus lens, a zoom lens, an optical image stabilization lens (OIS), an aperture, a shutter, and the like. The focus lens is a lens for changing a focus state of a subject image formed on the image sensor 115. The zoom lens is a lens for changing magnification of a subject image formed by the optical system. Each of the focus lens and the like includes one lens or a plurality of lenses.

The lens driver 112 drives the focus lens and the like in the optical system 110. The lens driver 112 includes a motor, and moves the focus lens along an optical axis of the optical system 110 based on control of the controller 135. A configuration for driving the focus lens in the lens driver 112 can be realized by a DC motor, a stepping motor, a servo motor, an ultrasonic motor, or the like.

The image sensor 115 captures a subject image formed via the optical system 110 to generate image capturing data. The image capturing data constitutes image data indicating an image captured by the image sensor 115. The image sensor 115 generates image data of a new frame at a predetermined frame rate (e.g., 30 frames/second). A generation timing of image capturing data and electronic shutter operation in the image sensor 115 are controlled by the controller 135. As the image sensor 115, various image sensors such as a CMOS image sensor, a CCD image sensor, or an NMOS image sensor can be used.

The image sensor 115 performs image capturing operation of a still image, image capturing operation of a through image, and the like. The through image is mainly a moving image, and is displayed on the display monitor 130 in order for a user to determine a composition for capturing a still image. Each of a through image and a still image is an example of a captured image in the present embodiment. The image sensor 115 is an example of an image sensor in the present embodiment.

The image sensor 115 according to the present embodiment includes a plurality of pixels functioning as pixels for image capturing and as sensor pixels for measuring a depth to a subject by an image plane phase detection method, the depth showing a distance between the digital camera 100 and the subject in an image indicated by the image data. The plurality of pixels are two-dimensionally arranged on an image plane of the image sensor 115 according to a horizontal direction and a vertical direction of a captured image. For example, each pixel constitutes a depth measurement point of the image plane phase detection method, and includes a photoelectric converter or the like divided so as to form two types of optical images obtained by pupil division in the optical system 110 on the image plane. The image sensor 115 of the present embodiment includes, for example, a signal processing circuit that applies various types of signal processing to a signal output from each pixel. Examples of various types of signal processing include, but are not limited to, gain adjustment and an optical black (OB) clamp for correcting a black level.

The image processing engine 120 performs various types of processing on image capturing data output from the image sensor 115 to generate image data, and performs various types of processing on image data to generate an image to be displayed on the display monitor 130. Examples of various types of processing include white balance correction, gamma correction, YC conversion processing, electronic zoom processing, compression processing, expansion processing, and the like, but the various types of processing are not limited to these. The image processing engine 120 may be configured by a hard-wired electronic circuit, or may be configured by a microcomputer using a program, a processor, or the like.

The display monitor 130 is an example of a display that displays various types of information. For example, the display monitor 130 displays an image (through image) indicated by image data captured by the image sensor 115 and subjected to image processing by the image processing engine 120. Further, the display monitor 130 displays a menu screen or the like for the user to perform various settings on the digital camera 100. The display monitor 130 can be configured by, for example, a liquid crystal display device or an organic EL device.

The user interface 150 is a general term for hard keys such as an operation button and an operation lever provided on the exterior of the digital camera 100, and receives operation by the user. The user interface 150 includes, for example, a release button for instructing start of shooting, a mode dial for setting various operation modes such as a shooting mode, and a touch panel. When receiving operation by the user, the user interface 150 transmits an operation signal corresponding to user operation to the controller 135.

The controller 135 integrally controls entire operation of the digital camera 100. The controller 135 includes a CPU and the like, and the CPU executes a program (software) to realize a predetermined function. For example, the controller 135 controls AF operation of the digital camera 100 by driving of the lens driver 112.

The controller 135 may include, instead of the CPU, a processor including a dedicated electronic circuit designed to realize a predetermined function. That is, the controller 135 can be realized with various processors such as a CPU, an MPU, a GPU, a DSU, an FPGA, and an ASIC. The controller 135 may be configured to include one or a plurality of processors. Further, the controller 135 may be configured to include one semiconductor chip together with the image processing engine 120 and the like.

The buffer memory 125 is a recording medium that functions as a work memory of the image processing engine 120 and the controller 135. The buffer memory 125 is realized by a dynamic random access memory (DRAM) or the like. The flash memory 145 is a nonvolatile recording medium. Further, although not illustrated, the controller 135 may include various internal memories, and for example, may incorporate a ROM. The ROM stores various programs to be executed by the controller 135. Further, the controller 135 may incorporate a RAM that functions as a work area of a CPU.

The card slot 140 is a means into which a removable memory card 142 is inserted. The memory card 142 can be connected to the card slot 140 electrically and mechanically. The memory card 142 is an external memory including a recording element such as a flash memory in the inside. The memory card 142 can store data such as image data generated by the image processing engine 120.

The communication module 155 is a communication module (circuit) that performs communication conforming to the communication standard IEEE802.11, a Wi-Fi standard, or the like. The digital camera 100 can communicate with another device via the communication module 155. The digital camera 100 may communicate directly with another device via the communication module 155 or may perform communication via an access point. The communication module 155 may be connectable to a communication network such as the Internet. The communication module 155 may function as an interface for wired connection to an external device according to a predetermined standard, and may include, for example, a connection circuit conforming to USB and/or HDMI (registered trademark) standard.

The power source 160 supplies power to each element in the digital camera 100. The temperature sensor 165 is realized by, for example, a thermistor, and outputs voltage corresponding to a change in ambient temperature. The temperature sensor 165 of the present embodiment is arranged to measure temperature of the image sensor 115. The temperature sensor 165 may include a circuit that converts output voltage of the thermistor into temperature. The controller 135 acquires temperature of the image sensor 115 measured by the temperature sensor 165. For example, the exterior temperature sensor 166 is realized by, for example, a thermistor similarly to temperature sensor 165, and is provided near the exterior of the digital camera 100.

1-1. AF Methods

In the digital camera 100 according to the present embodiment, each as an AF method to perform AF operation, a phase detection method using phase detection by an image plane phase detection method, and a contrast detection method can be used. Hereinafter, AF by a phase detection method will be referred to as "PDAF", and AF by a contrast detection method will be referred to as "contrast AF". The digital camera 100 of the present embodiment includes a plurality of operation modes for performing AF operation by each AF method in image capturing operation of various images.

In the PDAF method, for example, the image processing engine 120 calculates an evaluation value according to a focus state in the image sensor 115 according to depth measurement by the image plane phase detection method based on sensor signals output from pixels of the image sensor 115. The depth measurement by the image plane phase detection method can be performed, for example, by calculating a defocus amount or the like according to a difference between two types of optical images by pupil division from the sensor signal for each depth measurement point by the sensor pixels. A known technique can be appropriately applied to depth measurement by the image plane phase detection method and AF operation by the method (e.g., JP 2014-063142 A and JP 2021-005063 A).

In the contrast AF method, for example, the focus lens is driven so as to maximize a high-frequency component of a spatial frequency in signals output from pixels for image capturing included in the image sensor 115. For example, the image processing engine 120 calculates, as an evaluation value, contrast in an image indicated by image data generated based on the signals.

The digital camera 100 can set an AF method used for AF operation from such various AF methods according to various setting states such as a shooting mode. In AF operation, power consumed in the digital camera 100 may vary depending on a set AF method. Power consumption in each of such AF methods will be described with reference to FIGS. 2, 3A and 3B.

FIG. 2 is a diagram for explaining the AF methods in the digital camera 100. FIG. 2 illustrates, for the PDAF method and the contrast AF method, power consumption by the image sensor 115 in operation according to the methods as P1 and P2, respectively, and power consumption of a camera body such as various components of the digital camera 100 as P3 and P4, respectively. For example, in a continuous AF (AF-C) mode, power consumption illustrated in FIG. 2 is P2, P1, P4, and P3 in ascending order. In the AF-C mode, operation to track a motion of a subject is performed by moving object prediction, according to half-pressing operation of the release button or the like in image capturing operation of a through image or the like for still image shooting.

That is, in the PDAF method, power consumption of the image sensor 115 is larger than that in the contrast AF method, and the same relationship in power consumption for the two methods holds for the entire digital camera 100. For example, power consumption of the image sensor 115 in the PDAF method depends on an image sensor used in the digital camera 100, and is 1 W to 2 W. Power consumption of the image sensor 115 in the contrast AF method is lower than that in the PDAF method, and is, for example, 0.6 W to 1.2 W.

Figure 3A:
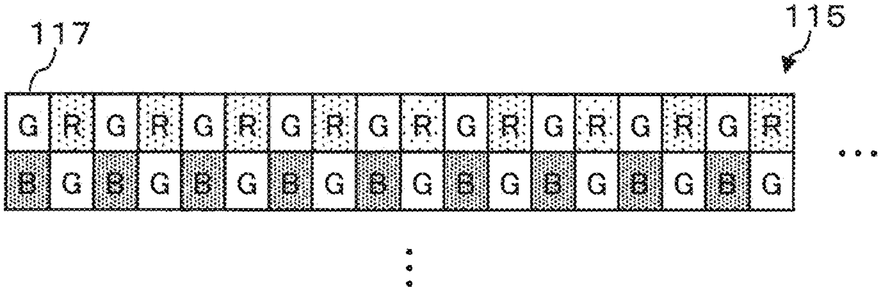
FIGS. 3A and 3B are diagrams for explaining an outline of pixel readout in the digital camera.
Figure 3B:
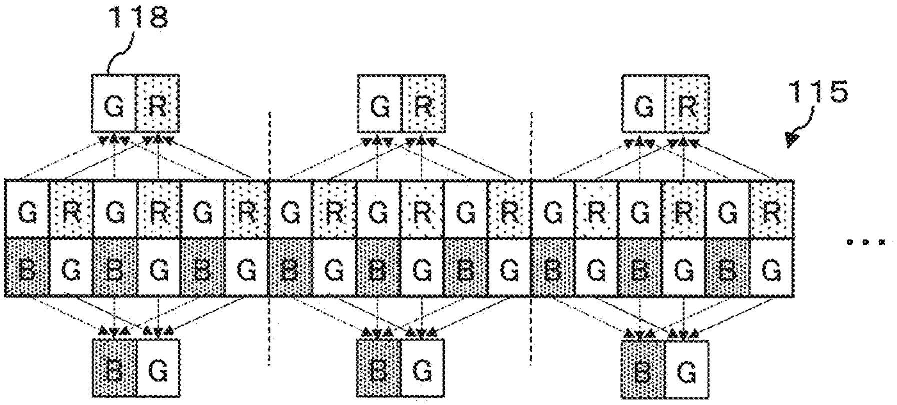

Such a difference in power consumption depending on the AF methods may be caused by, for example, a difference in pixel readout to read a signal from a pixel in the image sensor 115. FIGS. 3A and 3B are diagrams for describing an outline of pixel readout in the digital camera 100. FIGS. 3A and 3B illustrate an example in which a plurality of pixels corresponding to colors of R, G, and B are arranged in a Bayer pattern in the image sensor 115.

FIG. 3A exemplifies each pixel 117 as a readout target in full pixel readout in which signals are read from all pixels of the image sensor 115. FIG. 3B illustrates an example in which a pixel 118 is set as a readout target in the image sensor 115, the pixel 118 binning signals of three pixels in the horizontal directions by pixel mixture which adds signals (or data) from a plurality of pixels of the same color located in vicinity in the image sensor 115. According to the pixel mixture, for example, sensitivity, a dynamic range, and the like can be improved, and the number of pixels to be read is reduced as compared with the full pixel readout so that power in performing various types of signal processing on a signal of each pixel read in the image sensor 115 can be reduced.

In the digital camera 100, for example, the full pixel readout is used in the PDAF method, and the pixel mixture is used in the contrast AF method for power saving, since performance of AF operation is hardly affected in the contrast AF method when the pixel mixture is used. Further, in the contrast AF method, for example, in addition to the pixel mixture, pixel thinning out processing reading a signal from a part of pixels in the all pixels may be performed, the part of pixels being obtained by thinning out pixels in a vertical direction of the image sensor 115. The number of pixels to be read is also reduced as compared with the full pixel readout, and power consumption of the image sensor 115 can be reduced. Although FIG. 3B illustrates an example in which pixel mixture is applied to three pixels in the horizontal direction, the present disclosure is not limited to this example, and for example, pixel mixture processing may be performed on two pixels in the horizontal direction.

2. Operation

The operation of the digital camera 100 configured as described above will be described below.

2-1. Outline

The digital camera 100 of the present embodiment performs, for example, AF operation in the AF-C mode, switching between the two AF methods with different power consumption in image capturing operation of a through image or the like. An outline of such operation of the digital camera 100 will be described with reference to FIG. 4.

Figure 4:
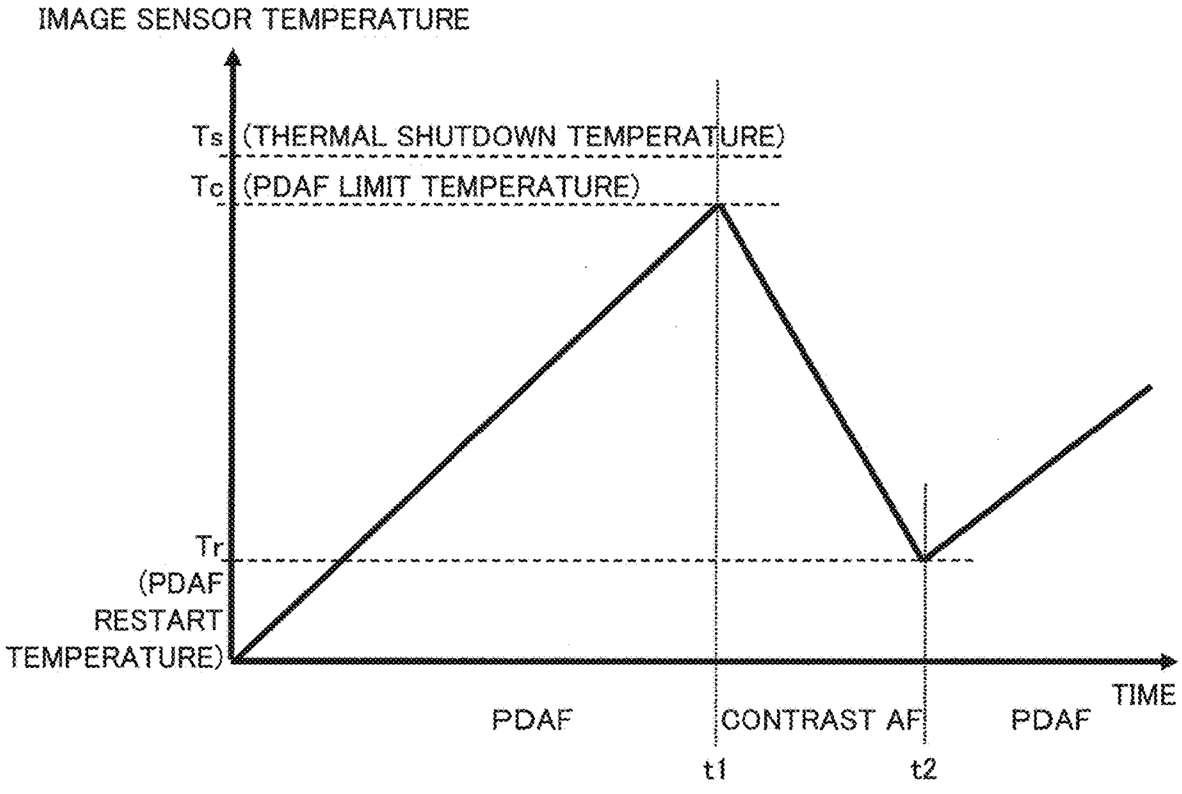
FIG. 4 is a diagram for explaining operation of the digital camera.

The digital camera 100 of the present embodiment measures temperature of the image sensor 115 at any time by the temperature sensor 165. FIG. 4 is a diagram for explaining operation of the digital camera 100 by a graph exemplifying a temporal change in image sensor temperature which indicates temperature of the image sensor 115 measured as described above. In the graph of FIG. 4, the vertical axis represents the image sensor temperature, and the horizontal axis represents time from start of AF operation.

In the example of FIG. 4, first, AF operation by the PDAF method is continuously performed, and the image sensor temperature rises. For example, as illustrated in FIG. 2, when continuous AF operation is performed in the AF-C mode for capturing a still image, in the PDAF method in which power consumption of the image sensor 115 and the like is relatively high, the image sensor temperature is likely to increase, and temperature of the camera body of the digital camera 100 is also likely to increase. For example, when the image sensor temperature or the like continues to increase and temperature of the various components exceeds expected temperature in an environment for which the digital camera 100 is designed to be used, it is concerned that operation may be affected or a failure may occur in the digital camera 100. Further, for example, in a case where temperature of the exterior of the digital camera 100 also increases, consideration may also be required for low-temperature burns and the like of the user who continues to hold the exterior during shooting.

Therefore, in the digital camera 100, for example, when the image sensor temperature increases and reaches predetermined temperature, it is conceivable to restrict execution of a predetermined function such as moving image shooting among functions that can be originally performed, in order to suppress increase in temperature. Such thermal shutdown of the digital camera 100 may cause inconvenience that the user cannot use a specific function itself.

In view of the above, for example, when the image sensor temperature increases in execution of AF operation by the PDAF method, the digital camera 100 of the present embodiment switches the PDAF method to the contrast AF method having smaller power consumption than the PDAF method, before temperature reaches the thermal shutdown temperature to continue the AF operation. In the example of FIG. 4, the PDAF method is switched to the contrast AF method at a PDAF limit temperature Tc (e.g., set to 65 °C in a case where the thermal shutdown temperature Ts is 70 °C) lower than the thermal shutdown temperature Ts indicating predetermined temperature (e.g., set from a range of 70 °C to 90 °C) at which the digital camera 100 is thermally shut down.

In the contrast AF method with relatively small power consumption, for example, even when AF operation is continuously performed, increase in the image sensor temperature may converge at temperature lower than the thermal shutdown temperature Ts. As described above, according to the digital camera 100 of the present embodiment, increase in temperature in operation can be suppressed, and the thermal shutdown can be avoided.

Furthermore, after switching to the contrast AF method, for example, as illustrated in FIG. 4, the digital camera 100 of the present embodiment switches the contrast AF method to the PDAF method again when the image sensor temperature decreases to PDAF restart temperature Tr (set to, e.g., 50 °C in a case where the thermal shutdown temperature Ts is 70 °C) set to be lower than the PDAF limit temperature Tc. Therefore, for example, relatively high-speed AF operation by depth measurement using the PDAF method can be performed until the image sensor temperature reaches the PDAF limit temperature Tc.

2-2. Switching Operation of AF Methods

Figure 5:
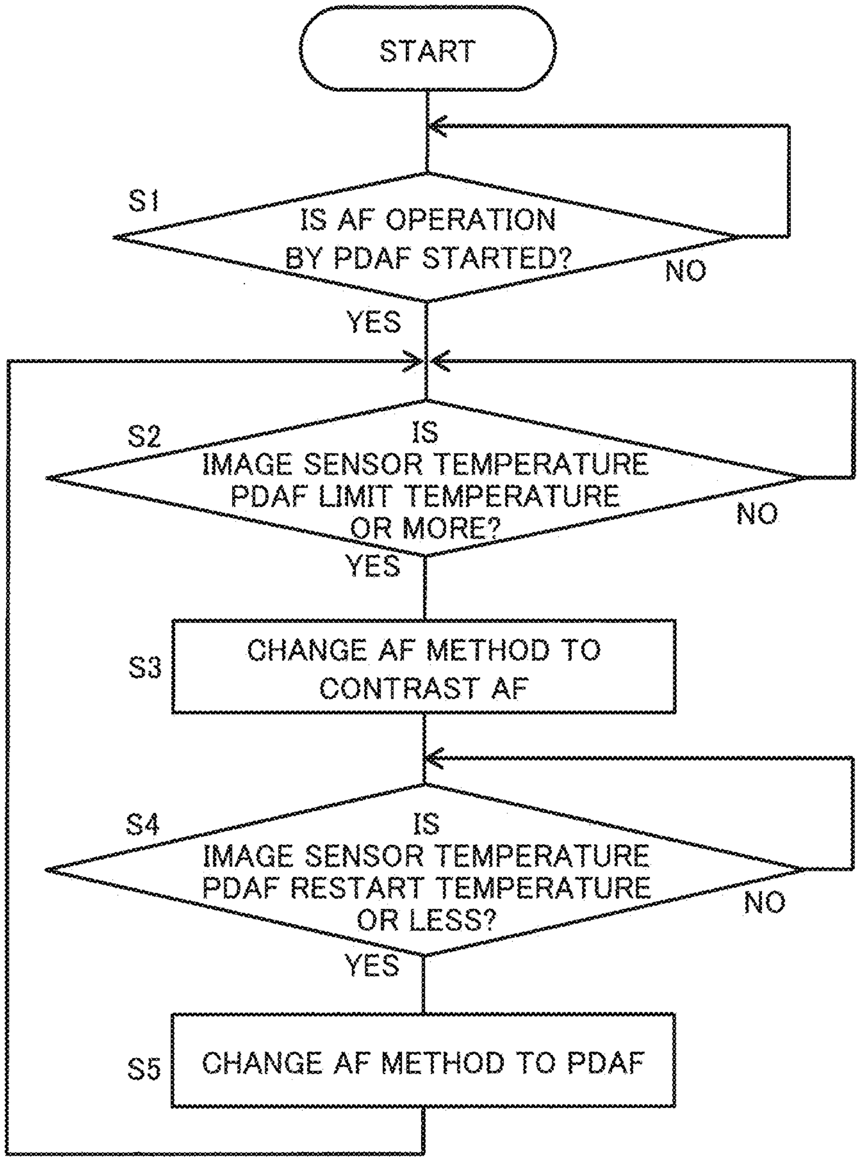
FIG. 5 is a flowchart for explaining operation of the digital camera.

Operation of switching AF methods in the digital camera 100 according to the present embodiment as described above will be described with reference to FIG. 5. FIG. 5 is a flowchart for explaining operation of the digital camera 100.

Processing illustrated in the flowchart of FIG. 5 is performed by the controller 135, for example, with the image sensor 115 performing image capturing operation of a through image or the like in a shooting mode for capturing a still image after the digital camera 100 is turned on.

First, the controller 135 of the digital camera 100 determines whether or not AF operation by the PDAF method is started in image capturing operation (S1). For example, the digital camera 100 starts AF operation by a set AF method when image capturing operation is started. In a case where AF operation of the PDAF method is not started, such as a case where the set AF method is the contrast AF method (NO in S1), the controller 135 repeats the determination in Step S1 at a predetermined period such as a frame period.

When AF operation by the PDAF method is started (YES in S1), the controller 135 determines whether or not the image sensor temperature reaches the PDAF limit temperature Tc based on a measurement result obtained by the temperature sensor 165 (S2). For example, the controller 135 acquires the image sensor temperature periodically measured from the temperature sensor 165, and determines whether or not the acquired image sensor temperature is equal to or higher than the PDAF limit temperature Tc.

In the digital camera 100 of the present embodiment, the PDAF limit temperature Tc is set in advance to temperature lower than the thermal shutdown temperature Ts. For example, set values of the temperatures Tc and Ts and the PDAF restart temperature Tr are stored in the flash memory 145 or the like. For each of the temperatures Tc, Ts, and Tr, for example, a plurality of types of setting values may be provided according to temperature indicated by a measurement result of the exterior temperature sensor 166 or the like. For example, in a case where temperature measured by the exterior temperature sensor 166 is relatively high, a set value of the PDAF limit temperature Tc may be used to have a larger difference from (i.e., lower than) the thermal shutdown temperature Ts than in a case where the temperature is relatively low. When the image sensor temperature does not reach the PDAF limit temperature Tc (NO in S2), the controller 135 repeats the determination in Step S2 at a predetermined period, for example.

When the image sensor temperature reaches the PDAF limit temperature Tc (YES in S2), the controller 135 changes an AF method used for performing AF operation from the PDAF method to the contrast AF method (S3). In the example of FIG. 4, after start of AF operation by the PDAF method (YES in S1), the image sensor temperature reaches the PDAF limit temperature Tc at a time t1 (YES in S2), and the AF method is switched from the PDAF method to the contrast AF method (S3).

After changing to the contrast AF method (S3), the controller 135 determines whether or not the image sensor temperature decreases to the PDAF restart temperature Tr (S4). The controller 135 performs the determination in Step S4 according to whether or not the image sensor temperature periodically acquired from the temperature sensor 165 is equal to or less than the PDAF restart temperature Tr, for example.

For example, in a case where AF operation by the PDAF method is restarted (S5 to be described later), the PDAF restart temperature Tr is set in advance to sufficiently low temperature from the viewpoint of lowering the image sensor temperature to the extent that AF operation by the PDAF method can be continuously performed again for a predetermined period. In the example of FIG. 4, the PDAF restart temperature Tr is set to be equal to or higher than temperature at which increase in the image sensor temperature converges in a case where AF operation in the contrast AF method is continuously performed. When the image sensor temperature does not decrease to the PDAF restart temperature Tr (NO in S4), the controller 135 repeats the determination in Step S4 at a predetermined period.

When the image sensor temperature decreases to the PDAF restart temperature Tr (YES in S4), the controller 135 changes the AF method used for performing AF operation from the contrast AF method to the PDAF method (S5). In the example of FIG. 4, after change is made to the contrast AF method at the time t1 (S3), the image sensor temperature decreases to the PDAF restart temperature Tr at a time t2 (YES in S4), and change is made again from the contrast AF method to the PDAF method (S5).

For example, the controller 135 repeats the processing in and after Step S2 until image capturing operation in a shooting mode being performed in the digital camera 100 is finished according to the user's operation or the like.

According to the above operation of the digital camera 100, after AF operation by the PDAF method is started (YES in S1), when the image sensor temperature reaches the PDAF limit temperature Tc (YES in S2), the AF method is changed to the contrast AF method (S3). In the digital camera 100, since power consumption in the AF operation is smaller in the contrast AF method than in the PDAF method (see FIG. 2), it is possible to suppress increase in temperature in operation. As described above, even when the image sensor temperature increases in image capturing operation in which AF operation by the PDAF method is performed, the thermal shutdown can be avoided by switching to the contrast AF method at the PDAF limit temperature Tc lower than the thermal shutdown temperature Ts. Therefore, for example, image capturing operation accompanying AF operation can be continued.

Furthermore, in the operation of the digital camera 100 described above, after the AF method is changed to the contrast AF method (S3), when the image sensor temperature decreases to the PDAF restart temperature Tr (YES in S4), the AF method is changed to the PDAF method (S5). As described above, by returning to the PDAF method in which AF operation is relatively fast when the image sensor temperature is decreased due to change to the contrast AF method, tracking performance of a subject in AF operation can be improved, for example.

In the above description, when the image sensor temperature decreases to the PDAF restart temperature Tr (YES in S4), the AF method is changed to the PDAF method (S5). In this case, the digital camera 100 may display, for example, a notification indicating that the PDAF method is available to the user on the display monitor 130 or the like instead of the processing of Step S5.

3. Summary

As described above, the digital camera 100 according to the present embodiment is an example of an imaging apparatus that performs image capturing operation by the two types of AF methods as an example of a plurality of operation modes. The digital camera 100 includes the image sensor 115 as an example of an image sensor, and the controller 135 as an example of a temperature acquisition circuit and a controller. The image sensor 115 captures a subject image via the optical system 110 to generate image data. The controller 135 acquires temperature of the image sensor 115. The controller 135 switches the two types of AF methods based on the temperature of the image sensor 115 (S1 to S5). The two types of AF methods include the PDAF method (an example of a first operation mode) and the contrast AF method (an example of a second operation mode) in which the image sensor 115 consumes less power than in the PDAF method. When the image sensor temperature, which is an example of the temperature of the image sensor 115, increases to the PDAF limit temperature Tc (an example of first temperature) (YES in S2) in image capturing operation in the PDAF method (YES in S1), the controller 135 changes an AF method of the digital camera 100 from the PDAF method to the contrast AF method (S3). The PDAF limit temperature Tc is lower than the thermal shutdown temperature Ts as an example of temperature at which execution of a predetermined function is limited in the digital camera 100.

According to the digital camera 100 described above, when the image sensor temperature increases to the PDAF limit temperature Tc (YES in S2) in image capturing operation in which AF operation by the PDAF method is performed (YES in S1), the AF method is changed from the PDAF method to the contrast AF method (S3). As exemplified in FIG. 2, the power consumption P2 by the image sensor 115 in the contrast AF method is smaller than the power consumption P1 in the PDAF method. As described above, by switching to the contrast AF method in which power consumption is smaller than the PDAF method, it is possible to suppress increase in temperature in operation of the digital camera 100. Further, when the increased image sensor temperature reaches the PDAF limit temperature Tc lower than the thermal shutdown temperature Ts, by changing the AF method in this manner, it is possible to avoid thermal shutdown in which execution of moving image capturing or the like as an example of a predetermined function is restricted in the digital camera 100.

In the present embodiment, after changing the AF method of the digital camera 100 from the PDAF method to the contrast AF method (S3), when the image sensor temperature decreases to the PDAF restart temperature Tr (an example of second temperature) lower than the PDAF limit temperature Tc in image capturing operation in the contrast AF method (YES in S4), the controller 135 changes the AF method of the digital camera 100 from the contrast AF method to the PDAF method (S5). In a case where the image sensor temperature decreases after change to the contrast method as described above, the AF method used for the AF operation can be returned to the PDAF method which is used before the change. In another exemplary embodiment, the digital camera 100 may not perform the processing of Steps S4 and S5.

In the present embodiment, the PDAF method and the contrast AF method (examples of the first and second operation modes, respectively) are the AF methods between which power consumption is different in autofocus (AF) operation in the image sensor 115. The digital camera 100 according to the present embodiment can avoid the thermal shutdown with continuing AF operation by switching AF methods which have different power consumptions.

In the present embodiment, in the PDAF method which is an example of the first operation mode, the digital camera 100 performs AF operation by a phase detection method, and in the contrast AF method which is an example of the second operation mode, the digital camera 100 performs AF operation by a contrast detection method. For example, in the PDAF method, high-speed performance of AF operation such as tracking of a moving subject can be improved by depth measurement in the phase detection method. Further, in the contrast AF method, when data is read from a pixel on the image sensor 115, AF operation can be performed with high accuracy with power consumption suppressed by pixel mixture.

In the present embodiment, the digital camera 100 performs image capturing operation of a still image such as shooting of a still image in the PDAF method and the contrast AF method. For example, in shooting of a still image, by generating image data for live view using pixel mixture, regardless of image quality or the like for recording an image in the digital camera 100, it is conceivable that temperature in operation can be easily controlled by changing the AF methods with different power consumption in pixel readout.

In the present embodiment, the PDAF method and the contrast AF method are AF methods between which power consumption of the image sensor 115 is different in reading signals output from the plurality of pixels included in the image sensor 115. As exemplified in FIG. 3A, in the PDAF method, the image sensor 115 reads signals from all the pixels 117 in the plurality of pixels. In the contrast AF method, the image sensor 115 reads a signal by binning two or more pixels as exemplified in FIG. 3B or thinning out a subset of pixels in the plurality of pixels. For example, in the contrast AF method, the pixel 118 obtained by pixel mixture is set as a readout target. According to the digital camera 100 of the present embodiment, based on the image sensor temperature, an AF method can be changed between the PDAF method and the contrast AF method in which power consumption is different from each other for such pixel readout.

In the present embodiment, the digital camera 100 includes the temperature sensor 165 capable of measuring the temperature of the image sensor 115, and the controller 135 acquires the image sensor temperature from the temperature sensor 165. Therefore, for example, an AF method can be changed based on the image sensor temperature accurately measured by the temperature sensor 165 capable of directly measuring temperature of the image sensor 115.

Second Embodiment

Hereinafter, a second embodiment of the present disclosure will be described with reference to FIGS. 6A, 6B and 7. In the first embodiment, the digital camera 100 that switches, according to the image sensor temperature, between the two types of AF methods between which power consumption is different. In the second embodiment, a digital camera that switches, according to the image sensor temperature, a plurality of pixel readout methods between which power consumption is different according to image quality in image shooting will be described.

Hereinafter, the digital camera according to the present embodiment will be described, but a configuration and operation similar to those of the digital camera 100 according to the first embodiment will be omitted from description appropriately.

1. Pixel Readout Methods

In the digital camera 100 of the present embodiment, three types of pixel readout methods can be used each as a method of pixel readout from each pixel of the image sensor 115. FIGS. 6A and 6B are diagrams for explaining a pixel readout method in the digital camera 100 of the present embodiment. For example, as illustrated in FIG. 6A, the pixel readout method includes a pixel thinning out method performing the pixel thinning out processing also in the horizontal direction of the image sensor 115, in addition to methods corresponding to the full pixel readout and the pixel mixture described with reference to FIGS. 3A and 3B in the first embodiment.

Figures 6A, 6B:
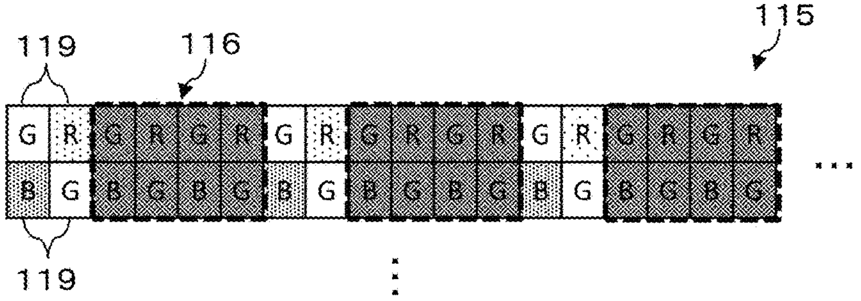
FIGS. 6A and 6B are diagrams for explaining a pixel readout method in the digital camera according to a second embodiment.

FIG. 6A illustrates, for the full pixel readout method, the pixel mixture method, and the pixel thinning out method, power consumption by the image sensor 115 in operation by the methods as P5, P6, and P7, respectively. For example, in a live view in which a moving image such as a through image is displayed on the display monitor 130 in real time, power consumption in FIG. 6A is P5, P6, and P7 in order of larger power consumption. That is, in the three types of pixel readout methods illustrated in FIG. 6A, power consumption is largest in the full pixel readout method, the second largest in the pixel mixture method, and the smallest in the pixel thinning out method.

FIG. 6B illustrates an example in which remaining pixels 119 after thinning out are set as readout targets, the remining pixels 119 being obtained by thinning out other pixels 116, by the pixel thinning out method, from a plurality of pixels in the image sensor 115 arranged similarly to pixels illustrated in FIGS. 3A and 3B. In such a pixel thinning out method, the number of pixels as readout targets is smaller than that in the full pixel readout method (see FIG. 3A), and power in performing various types of signal processing on a signal of each pixel read by the image sensor 115 is reduced. Further, as compared with the pixel mixture method (see FIG. 3B), for example, in the pixel thinning out method in which pixel mixture processing is not performed, power consumption related to pixel readout may be further reduced.

For example, in the live view, image quality in a case of displaying a captured image such as a through image is highest in the full pixel readout method in which the number of pixels to be read is the largest among the three types of the pixel readout methods illustrated in FIG. 6A, and is lower in the other pixel readout methods than in the full pixel readout method. The digital camera 100 of the present embodiment can switch various pixel readout methods, for example, by changing image quality for displaying a captured image in such a live view.

2. Operation

Figure 7:
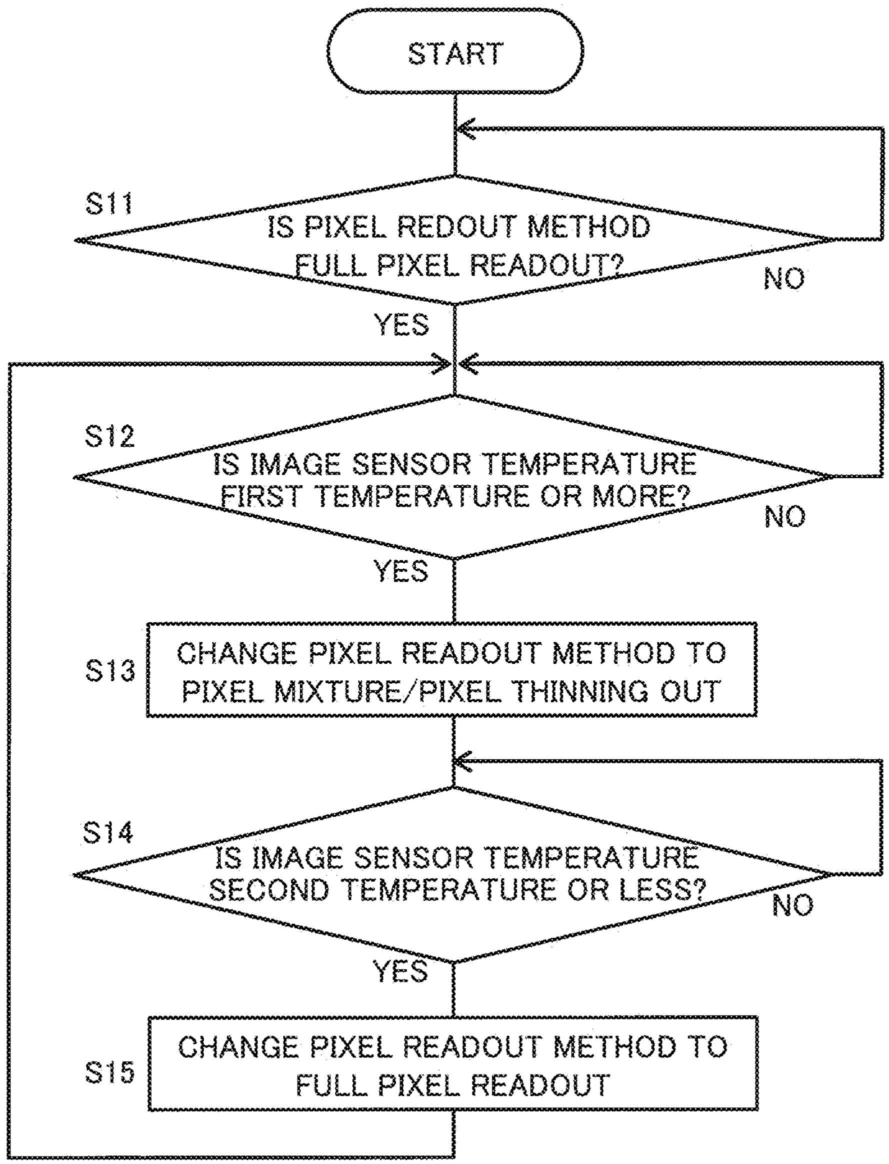
FIG. 7 is a flowchart for explaining operation of the digital camera of the second embodiment.

FIG. 7 is a flowchart for explaining operation of the digital camera 100 of the second embodiment. The digital camera 100 of the present embodiment performs processing illustrated in the flowchart of FIG. 7 instead of the processing of FIG. 5 of the first embodiment, for example, in execution of image capturing operation in a shooting mode for shooting a moving image or the like.

In the digital camera 100 of the present embodiment, for example, the controller 135 determines whether or not the pixel readout method used for displaying the live view is the full pixel readout method (S11), instead of Step S1 in which the AF method used for AF operation is determined in the first embodiment. In the digital camera 100 of the present embodiment, for example, information indicating a corresponding relationship between image quality of displaying the live view and a pixel readout method may be stored in advance in the flash memory 145 or the like. In the digital camera 100, the controller 135 may determine a pixel readout method from image quality set for recording a captured image, for example, referring the information.

When the pixel readout method is the full pixel readout method (YES in S11), the controller 135 of the present embodiment determines whether or not the image sensor temperature reaches a first temperature (S12) instead of Step S2 in which temperature increase to the PDAF limit temperature Tc is determined in the first embodiment. The first temperature is preset to be lower than the thermal shutdown temperature Ts, for example, similarly to the PDAF limit temperature Tc of the first embodiment.

When the image sensor temperature reaches the first temperature (YES in S12), the controller 135 of the present embodiment changes the pixel readout method from the full pixel readout method to the pixel mixture or the pixel thinning out method (S13) instead of Step S3 in which the AF method is changed in the first embodiment, for example. In Step S13, the controller 135 changes the pixel readout method used for displaying the live view to a method with lower power consumption, for example, by lowering image quality of the live view compared to the image quality before the image sensor temperature reaches the first temperature (NO in S12).

After changing to the pixel mixture method or the pixel thinning out method (S13), the controller 135 of the present embodiment determines whether or not the image sensor temperature decreases to second temperature lower than the first temperature (S14) instead of Step S4 in which temperature decrease to the PDAF restart temperature Tr is determined in the first embodiment. The second temperature is set in advance to sufficiently low temperature from the viewpoint of decreasing the image sensor temperature to the extent that displaying the live view by the full pixel readout method can be continued for a predetermined period even when displaying the live view by the method is resumed, for example. The second temperature may be the same as or different from the PDAF restart temperature Tr of the first embodiment.

When the image sensor temperature decreases to the second temperature (YES in S14), the controller 135 of the present embodiment changes the pixel readout method from the pixel mixture or pixel thinning out method to the full pixel readout method again (S15) instead of Step S5 of the first embodiment in which an AF method is changed again. In Step S15, the controller 135 changes the pixel readout method, for example, by returning image quality of displaying the live view to image quality corresponding to the full pixel readout method.

According to the above operation of the digital camera 100, for example, by changing a corresponding pixel readout method to a method with lower power consumption by changing image quality in displaying the live view (S11 to S13), it is possible to suppress temperature increase as in the first embodiment. For example, in the digital camera 100, it is expected that temperature in operation can be easily controlled by changing image quality in shooting of a moving image, in which displaying the live view is performed with image quality similar to image quality for recording an image. Further, in a case where the image sensor temperature decreases after a change is made to a pixel readout method with smaller power consumption as described above (YES in S14), image quality of the live view can be improved, for example, by returning to the full pixel readout method used before the change (S15).

An example of changing the pixel readout method in shooting a moving image is described above, but the present disclosure is not limited to this, and a pixel readout method may be changed by the above operation of the digital camera 100 in shooting a still image.

3. Summary

In the present embodiment, the full pixel readout method, as an example of the first operation mode, and the pixel mixture method or the pixel thinning out method, each as an example of the second operation mode, of the digital camera 100 are pixel readout methods between which power consumption is different in reading signals output from a plurality of pixels included in the image sensor 115. In the full pixel readout method, the image sensor 115 reads signals from all the pixels 117 in the plurality of pixels (see FIG. 3A). In the pixel mixture method or the pixel thinning out method, the image sensor 115 reads signals by binning two or more pixels or thinning out a subset of pixels respectively in the plurality of pixels (see FIGS. 3B and 6B), an example of the subset of pixels being pixels 116 other than the remaining pixels 119 to be read. Even with the digital camera 100 of the present embodiment, it is possible to suppress increase in temperature in operation by changing the pixel readout methods with different power consumption as described above according to the image sensor temperature, for example, by changing image quality of displaying the live view or the like.

Other Embodiments

As described above, the first and second embodiments are described as an example of the technique disclosed in the present application. However, the technique in the present disclosure is not limited to this, and is applicable to an embodiment in which changes, replacements, additions, omissions, and the like are appropriately made. Further, constituents described in the first and second embodiments can also be combined to form a new embodiment.

In the first and second embodiments described above, in the digital camera 100, the controller 135 acquires the image sensor temperature from the temperature sensor 165 arranged to measure temperature of the image sensor 115. In the present embodiment, the controller 135 may acquire the image sensor temperature based on a measurement result by a temperature sensor provided at a position different from the image sensor 115 in the digital camera 100, without limitation to the temperature sensor 165.

For example, the controller 135 of the present embodiment may acquire temperature measured in vicinity of the exterior of the digital camera 100 from the exterior temperature sensor 166 illustrated in FIG. 1, and calculate the image sensor temperature based on the acquired temperature. For example, in the digital camera 100 of the present embodiment, information indicating a relationship between temperature measured by the exterior temperature sensor 166 and the image sensor temperature may be stored in advance in the flash memory 145 or the like, and the controller 135 may calculate the image sensor temperature with reference to the information.

As described above, the digital camera 100 of the present embodiment includes the exterior temperature sensor 166 as an example of a temperature sensor capable of measuring temperature of a part different from the image sensor 115 in the digital camera 100. The controller 135, which is an example of a temperature acquisition circuit, calculates temperature of the image sensor 115 based on a measurement result obtained by the exterior temperature sensor 166. An operation mode of the digital camera 100 such as an AF method or a pixel readout method can be changed based also on the image sensor temperature calculated in the above manner so as to suppress increase in temperature during operation, for example, as in the first and second embodiments.

Even with the digital camera 100 described above, it is possible to suppress increase in temperature during operation by changing operation modes such as an AF method or a pixel readout method based on the image sensor temperature calculated based on a measurement result of the exterior temperature sensor 166, for example, as in the first and second embodiments. Further, the digital camera may change the operation mode similarly to the first and second embodiments, for example, according to temperature in the vicinity of the exterior measured by the exterior temperature sensor 166, without limitation to the image sensor temperature. For example, the thermal shutdown temperature Ts of the digital camera may also be set from the viewpoint of avoiding low-temperature burns and the like of the user by continuous contact with the exterior when temperature in the vicinity of the exterior increases. By the operation according to temperature in the vicinity of the exterior as described above, safety can be improved while the thermal shutdown is avoided.

In each of the above embodiments, the digital camera 100 including the temperature sensor 165 and the exterior temperature sensor 166 is described. The digital camera of the present embodiment may be configured to include only one temperature sensor used to acquire the image sensor temperature between the temperature sensors 165 and 166. Further, the digital camera can be implemented not to include a temperature sensor. For example, the controller 135 may acquire information indicating temperature in the vicinity of the exterior or the like by the communication module 155 from a temperature sensor or the like provided outside the digital camera.

In the first embodiment described above, the digital camera 100 performs AF operation by the PDAF method and the contrast AF method as examples of the first and second operation modes, respectively. In the present embodiment, the first and second operation modes are not limited to these, and various depth measurement methods or AF operation using depth information can be applied. For example, instead of the contrast AF method, a DFD method using depth measurement by a depth from defocus (DFD) technique for AF operation, a time of flight (TOF) method in which a depth measurement sensor is arranged inside or outside the digital camera 100, or a depth measurement method using depth measurement by various types of active sensing such as a range finder may be applied. The digital camera 100 may perform AF operation by combining such various AF methods.

In the above embodiment, for example, in the DFD method, power consumption can be reduced as compared with the PDAF method by using pixel mixture in the horizontal direction of the image sensor 115 as in the contrast AF method. Further, in the depth measurement method by active sensing, since pixel readout from the image sensor 115 is not performed by using a sensor different from the image sensor 115, power consumption can be reduced as compared with the PDAF method.

As described above, in the present embodiment, the digital camera 100 performs AF operation in at least one of the contrast detection method, the DFD method, and the depth measurement method by active sensing each as an example of the second operation mode. Therefore as well, in the second operation mode, AF operation can be performed with power consumption smaller than that of the PDAF method which is an example of the first operation mode.

In the first embodiment described above, after changing the AF method from the PDAF method to the contrast AF method (S3), when the image sensor temperature decreases to the PDAF restart temperature Tr (YES in S4), the digital camera 100 again changes the AF method to the PDAF method (S5). The digital camera of the present embodiment may determine whether or not a predetermined period elapses after changing to the contrast AF method (S3), and change the AF method to the PDAF method when the predetermined period elapses (S5), for example, instead of Step S4 in which decrease in the image sensor temperature is determined. Further, each AF method may be intermittently switched every predetermined period to change the AF method. The predetermined period may be set by the number of frames captured in image capturing operation in the period.

Further, in the above embodiment, the digital camera may change back to the PDAF method (S5) after making a change to the contrast AF method (S3), for example, in a case where a predetermined number (ten or the like) of still images are recorded during AF operation in the changed AF method. After the above, the digital camera of the present embodiment may switch each AF method every time a predetermined number of still images are recorded.

In the first embodiment described above, an example in which the digital camera 100 changes an AF method from the PDAF method to the contrast AF method when the image sensor temperature increases to the PDAF limit temperature Tc (YES in S2) is described (S3). For example, when the image sensor temperature increases to predetermined temperature, the digital camera of the present embodiment may present a change to the contrast AF method according to a shooting scene to the user by display on the display monitor 130 or the like. For example, a change to the contrast AF method may be proposed, by reading images captured immediately before from the memory card 142 or the like, in a shooting scene in which movement of a subject such as a landscape is relatively small and an advantage of using the PDAF method such as high-speed AF operation is not necessarily assumed.

In the above embodiment, for example, an AF method may be changed to the contrast AF method according to operation of the user who accepts a change to the presented contrast AF method on the user interface 150. Further, the digital camera may automatically change the AF method according to a shooting scene without performing such presentation to the user and operation by the user. The predetermined temperature in the present embodiment may be set to, for example, temperature equal to or less than the PDAF limit temperature Tc.

In the first embodiment described above, an example in which the digital camera 100 changes an AF method used for AF operation in shooting a still image. In the present embodiment, the digital camera may change an AF method as in the first embodiment in, for example, shooting of a moving image, without limitation to a still image.

In each of the above embodiments, a configuration in which the digital camera 100 does not particularly include a cooling fan is described. According to operation of the digital camera 100 of each of the above embodiments, it is possible to suppress increase in temperature in operation even when such a fan or the like is not included, and for example, it is possible to avoid thermal shutdown. However, the digital camera of the present embodiment may further include a cooling fan. In such a digital camera, for example, increase in temperature in operation can be further suppressed by driving the fan, and decrease in the image sensor temperature can be accelerated.

In each of the above embodiments, moving image shooting is exemplified as a function whose execution is restricted by the thermal shutdown of the digital camera 100. The function whose execution is restricted by the thermal shutdown may be, for example, recording of an image in which image data is written in the memory card 142, outputting of image data by HDMI connection in the communication module 155, and/or power supply by USB connection, in addition to or instead of moving image shooting. In the thermal shutdown, execution of any one or a combination of a plurality of functions may be restricted, or power supply from the power source 160 to each unit of the digital camera may be stopped (i.e., power supply of the digital camera is cut off).

In the first embodiment described above, an example in which the pixel thinning out is performed only in the vertical direction of the image sensor 115 in the contrast AF method is described. In the present embodiment, in the contrast AF method, pixel thinning out may also be performed in the horizontal direction of the image sensor 115.

Further, in each of the above embodiments, the digital camera 100 including the optical system 110 and the lens driver 112 is exemplified. The imaging apparatus of the present embodiment does not need to include the optical system 110 or the lens driver 112, and may be, for example, an interchangeable lens type camera capable of performing AF operation.

Further, in the above embodiments, a digital camera is described as an example of an imaging apparatus, but the present disclosure is not limited to this. The imaging apparatus of the present disclosure may be an electronic device having an image shooting function in a plurality of operation modes (e.g., a video camera, a smartphone, a tablet terminal, or the like).

As described above, the embodiment is described as an exemplification of the technique in the present disclosure. For this purpose, the accompanying drawings and the detailed description are provided.

Accordingly, the constituent elements described in the accompanying drawings and the detailed description may include not only a constituent element essential for solving the problem, but also a constituent element not essential for solving the problem in order to exemplify the technique. For this reason, it should not be recognized that those non-essential constituent elements are essential just because those non-essential constituent elements are described in the accompanying drawings and the detailed description.

Further, the above-described embodiment is provided to exemplify the technique in the present disclosure, and hence it is possible to make various changes, replacements, additions, omissions, and the like within the scope of claims or the scope equivalent to claims.

ASPECTS OF PRESENT DISCLOSURE

Hereinafter, aspects of the present disclosure will be exemplified.

A first aspect according to the present disclosure is an imaging apparatus that performs image capturing operation in a plurality of operation modes. The imaging apparatus of the first aspect includes an image sensor that captures a subject image via an optical system to generate image data, a temperature acquisition circuit that acquires temperature of the image sensor, and a controller that switches a plurality of operation modes based on the temperature of the image sensor. The plurality of operation modes includes a first operation mode and a second operation mode in which the image sensor consumes less power than in the first operation mode. The controller changes an operation mode of the imaging apparatus from the first operation mode to the second operation mode when the temperature of the image sensor increases to first temperature in image capturing operation in the first operation mode. The first temperature is lower than temperature at which execution of a predetermined function is restricted in the imaging apparatus.

In a second aspect, in the imaging apparatus of the first aspect, the controller, after changing the operation mode of the imaging apparatus from the first operation mode to the second operation mode, changes the operation mode of the imaging apparatus from the second operation mode to the first operation mode when the temperature of the image sensor decreases to second temperature lower than the first temperature in image capturing operation in the second operation mode.

In a third aspect, in the imaging apparatus according to the first or second aspect, the first operation mode has different power consumption than the second operation mode in autofocus operation in the image sensor.

In a fourth aspect, the imaging apparatus according to the third aspect performs, in the first operation mode, the autofocus operation by a phase detection method, and, in the second operation mode, the imaging apparatus performs the autofocus operation by at least one of a contrast detection method, a depth from defocus (DFD) method, and a depth measurement method by active sensing.

In a fifth aspect, the imaging apparatus of the third aspect performs image capturing operation of a still image in the first and second operation modes.

In a sixth aspect, in the imaging apparatus according to any of the first to fifth aspects, the first operation mode has different power consumption of the image sensor than the second operation mode in reading a signal output from a plurality of pixels included in the image sensor. In the first operation mode, the image sensor reads signals from all pixels in the plurality of pixels. In the second operation mode, the image sensor reads a signal by binning two or more pixels or thinning out a subset of pixels in the plurality of pixels.

In a seventh aspect, the imaging apparatus according to any of the first to sixth aspects further includes a temperature sensor capable of measuring the temperature of the image sensor, and the temperature acquisition circuit acquires the temperature of the image sensor from the temperature sensor.

In an eighth aspect, the imaging apparatus according to any of the first to sixth aspects further includes a temperature sensor capable of measuring temperature of a part different from the image sensor, and the temperature acquisition circuit calculates the temperature of the image sensor based on a measurement result obtained by the temperature sensor.

The present disclosure is applicable to various imaging apparatuses that perform image capturing operation in a plurality of operation modes.

What is claimed is:

1. An imaging apparatus that performs image capturing operation in a plurality of operation modes, the imaging apparatus comprising:

an image sensor that captures a subject image via an optical system to generate image data;

a temperature acquisition circuit that acquires temperature of the image sensor; and a controller that switches the plurality of operation modes based on the temperature of the image sensor, wherein the plurality of operation modes includes a first operation mode and a second operation mode in which the image sensor consumes less power than in the first operation mode, the controller changes an operation mode of the imaging apparatus from the first operation mode to the second operation mode when the temperature of the image sensor increases to first temperature in image capturing operation in the first operation mode, the first temperature is lower than temperature at which execution of a predetermined function is restricted in the imaging apparatus, the first operation mode and the second operation mode are associated with different methods of autofocus operation using the image sensor and have different power consumption for the autofocus operation, and in the first operation mode, the imaging apparatus uses a phase detection method to perform the autofocus operation.

2. The imaging apparatus according to claim 1, wherein the controller, after changing the operation mode of the imaging apparatus from the first operation mode to the second operation mode, changes the operation mode of the imaging apparatus from the second operation mode to the first operation mode when the temperature of the image sensor decreases to second temperature lower than the first temperature in image capturing operation in the second operation mode.

3. The imaging apparatus according to claim 1, wherein the imaging apparatus performs image capturing operation of a still image in the first and second operation modes.

4. The imaging apparatus according to claim 1, wherein the first operation mode has different power consumption of the image sensor than the second operation mode in reading a signal output from a plurality of pixels included in the image sensor, in the first operation mode, the image sensor reads a signal from all pixels in the plurality of pixels, and in the second operation mode, the image sensor reads a signal by binning two or more pixels or thinning out a subset of pixels in the plurality of pixels.

5. The imaging apparatus according to claim 1, further comprising a temperature sensor capable of measuring the temperature of the image sensor, wherein the temperature acquisition circuit acquires the temperature of the image sensor from the temperature sensor.

6. The imaging apparatus according to claim 1, further comprising a temperature sensor capable of measuring temperature of a part different from the image sensor in the imaging apparatus, wherein the temperature acquisition circuit calculates the temperature of the image sensor based on a measurement result obtained by the temperature sensor.

7. The imaging apparatus according to claim 1, wherein in the first operation mode, the imaging apparatus uses an on-sensor phase detection method as the phase detection method to perform the autofocus operation.

8. The imaging apparatus according to claim 1, wherein in the second operation mode, the imaging apparatus uses, to perform the autofocus operation, at least one of a contrast detection method, a depth from defocus (DFD) method, or a depth measurement method by active sensing.

* * * * *